(12) United States Patent
Kim

(10) Patent No.: US 8,472,164 B2
(45) Date of Patent: Jun. 25, 2013

(54) STACKING TYPE ELECTROCHEMICAL CELL HAVING QUASI-BIPOLAR STRUCTURE

(75) Inventor: Seong Min Kim, Daejeon (KR)

(73) Assignee: Kim's Techknowledge Inc., Daejeon (KR)

( * ) Notice: Subject to any disclaimer, the term of this patent is extended or adjusted under 35 U.S.C. 154(b) by 472 days.

(21) Appl. No.: 12/681,608

(22) PCT Filed: Oct. 10, 2008

(86) PCT No.: PCT/KR2008/005987
§ 371 (c)(1),
(2), (4) Date: Apr. 2, 2010

(87) PCT Pub. No.: WO2009/054632
PCT Pub. Date: Apr. 30, 2009

(65) Prior Publication Data
US 2010/0273035 A1    Oct. 28, 2010

(30) Foreign Application Priority Data
Oct. 25, 2007   (KR) .......................... 10-2007-0107684

(51) Int. Cl.
*H01G 5/38* (2006.01)
*H01G 9/155* (2006.01)

(52) U.S. Cl.
USPC ......................................... 361/522; 361/502

(58) Field of Classification Search
USPC ......................................... 361/502–503, 522
See application file for complete search history.

(56) References Cited

U.S. PATENT DOCUMENTS

| 4,616,290 | A | * | 10/1986 | Watanabe et al. | 361/328 |
| 5,012,385 | A | * | 4/1991 | Kurabayashi et al. | 361/328 |
| 5,367,431 | A | * | 11/1994 | Kunishi et al. | 361/502 |
| 5,369,546 | A | * | 11/1994 | Saito et al. | 361/502 |

FOREIGN PATENT DOCUMENTS

| JP | 05251272 | A | * | 9/1993 |
| JP | 05308034 | A | * | 11/1993 |
| JP | 09-231993 | A | | 9/1997 |
| JP | 2003-257473 | A | | 9/2003 |
| JP | 2007-122968 | A | | 5/2007 |

OTHER PUBLICATIONS

International Search Report for PCT/KR2008/005987 filed on Oct. 10, 2008.

* cited by examiner

*Primary Examiner* — Eric Thomas

(57) ABSTRACT

Provided is a stacking type quasi-bipolar electrochemical cell having a reliable, easy-to-manufacture, and simple structure. The electrochemical cell includes: an electrode including a current collector, and positive and negative active material layers disposed at both sides of the current collector and spaced apart from each other with a current collector extension part being located therebetween, wherein a polarity of the electrode is used as an opposite polarity in a neighboring cell; an electrode assembly formed by stacking a plurality of electrodes including the electrode; and an electric connection part connecting some of the electrodes of the electrode assembly which are included in the same series, the electric connection part connecting the some electrodes in parallel.

20 Claims, 12 Drawing Sheets

STACKING TYPE ELECTROCHEMICAL CELL HAVING QUASI-BIPOLAR STRUCTURE

TECHNICAL FIELD

The present disclosure relates to a stacking type electrochemical cell having a quasi-bipolar structure, and in particularly, to an electrochemical cell in which electrodes included in the same series are connected in parallel.

BACKGROUND ART

In general, electrochemical cells have a mono polar structure. Such a mono polar electrochemical cell includes a positive electrode composed of a positive active material formed on a current collector and a negative electrode composed of a negative active material formed on another current collector. These electrodes are disposed with opposite polarity sides facing each other, and a separator is inserted between the electrodes to form a unit-cell structure.

FIG. 1 illustrates a mono polar electrochemical cell of the related art.

Referring to FIG. 1, the electrochemical cell 10 of the related art includes a positive electrode 11, a negative electrode 12, a separator 13, an electrolyte 14, terminals 15-1 and 15-2, and a case 16. The illustrated electrochemical cell is the minimum basic operation unit which is called a unit cell.

Electric energy is stored in the positive electrode 11 and the negative electrode 12.

The separator 13 inserted between the positive and negative electrodes 11 and 12 is electrically nonconductive. However, the separator 13 may be omitted if the positive and negative electrodes 11 and 12 can be spaced apart from each other without the separator 13. In a recent battery such as a lithium polymer battery, solid polymer electrolyte is used instead of a separator; however, the solid polymer electrolyte contains a liquid electrolyte, and electrochemical reactions are produced by ions contained in the liquid electrolyte. That is, basically, the lithium battery is not different from a battery using a separator and a liquid electrolyte.

The separator 13 is formed of a material capable of transmitting the electrolyte 14, such as porous polymer, fiber glass mat, and paper.

The operational voltage of such electrochemical unit cells having the above-described structure is only several volts. Among electrochemical cell batteries, a lithium ion battery has a relatively high operational voltage; however, the nominal voltage of the unit cells of the lithium ion battery is also low at about 3.6 Volts.

Therefore, as shown by unit cells 21, 22, and 23 in FIG. 2, electrochemical cells should be connected in series for being used in application fields such as industrial and vehicle application fields requiring several tens to several hundreds of volts.

Since the unit cells 21, 22, and 23 are connected in series, the assembled structure and assembling processes are complicated, and additional parts such as bus bars and screws are necessary. Furthermore, the volume, weight, and resistance of the assembled structure are increased. As shown in FIG. 2, bus bars are used to connect neighboring unit cells, and screws are used to fix the bus bars to the unit cells.

An electrochemical cell 30 having a bipolar structure as shown in FIG. 3 has been developed to address the above-described limitation.

In the electrochemical cell 30 having a bipolar structure, electrodes having opposite polarities are formed on both sides of current collectors 31 and electrodes having opposite polarities face each other with a separator 32 being disposed therebetween. The lowermost electrode is composed of an active material layer formed on one side of the lowermost current collector 31, and the uppermost electrode is composed of an active material layer formed on one side of the uppermost current collector 31.

In manufacturing electrodes of the bipolar electrochemical cell 30, if positive and negative electrodes are formed on the same material of the current collector 31, a positive active material layer 33 and a negative active material layer 34 are formed on both sides of the current collector 31 having a sheet shape. If positive and negative electrodes have to be formed on different materials of the current collector 31, a complex current collector having a laminated structure formed of different materials is used as the current collector 31. In FIG. 3, reference numeral 35 denotes gaskets, and reference numerals 36 and 37 denote terminals. The gaskets 35 are used as electrolyte sealing and isolating members for sealing unit cells, such that undesired phenomena such as current leakage, side reactions, corrosion caused by the side reactions can be prevented between unit cells.

Generally, in a lithium ion battery, a current collector used for a positive electrode is formed of aluminum, and a current collector used for a negative electrode is formed of copper. In a lithium ion battery having a bipolar structure, current collectors having a multi-layer structure composed of aluminum and copper lamination sheets may be used. In a general electrochemical cell having a bipolar structure, an electrolyte isolation member is installed on an edge portion of an electrode so as to prevent undesired phenomena between unit cells, such as current leakage, side reactions, and corrosion caused by the side reactions. For the same reason, an electrolyte should not be transmitted through a current collector of an electrode in the electrochemical cell having a bipolar structure.

In the bipolar structure, if electrolytes of neighboring unit cells are not securely isolated, current leakage occurs between the unit cells, and the unit cells corrode easily. Therefore, it is very difficult to isolate electrolytes of neighboring unit cells securely for a long time under various operation environments.

Another limitation of a bipolar electrochemical cell is that it is difficult to manufacture a high-capacity bipolar electrochemical cell. The areas of electrodes should be increased to increase the capacity of a bipolar electrochemical cell; however, in this case, the structural strength of the bipolar electrochemical cell is reduced, and it is more difficult to isolate electrolytes of neighboring unit cells and inject electrolyte into the unit cells. Furthermore, it is troublesome to assemble electrodes and separators into an electrochemical cell after electrolyte is filled between the electrodes and the separators.

An electrochemical cell having a quasi-bipolar structure similar to the bipolar structure has been developed.

FIG. 4 is a cross-sectional view illustrating a quasi-bipolar electrochemical cell of the related art.

Referring to FIG. 4, the quasi-bipolar electrochemical cell 40 includes current collectors 41, separators 42, positive active material layers 43, negative active material layers 44 and 45, and gaskets 46.

FIG. 5 is a perspective view illustrating an electrode of an electrochemical cell having a quasi-bipolar structure according to the related art. In the above-described bipolar electrochemical cell, active material layers having opposite polarities are disposed on both sides of a current collector. However, as shown in FIG. 5, a quasi-bipolar electrochemical cell 50 includes mono polar electrodes and a quasi-bipolar electrode.

The mono polar electrodes include current collectors 51 and 52, and positive and negative active material layers 53 and 54 respectively disposed on the current collectors 51 and 52 for being connected to terminals. The quasi-bipolar electrode includes a current collector 56, and positive and negative active material layers 57 and 58 disposed on the current collector 56 and spaced apart from each other with a current collector extension part 55 being located therebetween.

The electrodes are arranged in a manner such that electrodes having opposite polarities face each other, and separators are disposed between the electrodes. In the quasi-bipolar structure, the quasi-bipolar electrode is used as opposite electrodes of neighboring unit cells. That is, neighboring unit cells are connected in series to each other through the current collector extension part of the quasi-bipolar electrode. In a bipolar structure, a current flows in a direction perpendicular to electrodes; however, in a quasi-bipolar structure, a current flows in a direction parallel to electrodes, that is, in a direction parallel to current collectors. In a quasi-bipolar electrochemical cell, an electrolyte isolation member, such as a gasket and an adhesive that are formed of a nonconductive material through which electrolyte cannot be transmitted, is disposed on a current collector extension part of a quasi-bipolar electrode located at the center portion of the quasi-bipolar electrode so as to isolate electrolytes of neighboring unit cells. However, if there is no extra electrolyte except for electrolyte at an active material layer of an electrode and a separator, such an electrolyte isolation member is not always necessary. In a sealed recombination lead acid battery, extra electrolyte does not exist at other regions than an active material layer of an electrode and a separator, and although extra electrolyte may exist, the extra electrolyte evaporates by an electrochemical reaction. Therefore, in a certain case, an electrolyte isolation member may be not necessary.

In manufacturing electrodes of an electrochemical cell having a quasi-bipolar structure, if the same material of a current collector is used for positive and negative electrodes, electrodes are formed by a generally used active material forming method using a sheet, mesh, or grid current collector; however, if different current collector materials are used for positive and negative electrodes, after positive and negative electrodes are formed in a manner such that an active material does not exist at edge portions of a current collector, the portions where an active material does not exist may be electrically connected by an electric connecting method such as welding so as to form electrodes. Generally, the surface of a current collector is treated like an etched aluminum foil to increase the surface area of the current collector so as to attach an active material layer to the surface of the current collector more reliably.

In a method of forming a high-capacity quasi-bipolar electrochemical cell, unit cells are formed by stacking a plurality of electrodes. According to the method, a positive or negative electrode is formed on a portion of a side of a current collector, and another electrode having an opposite polarity is formed on the other portion of the side of the current collector. Then, positive and negative electrodes are formed on the other side of the current collector in a manner such that electrodes having the same polarity overlap each other with the current collector being disposed therebetween. At this time, current collector extension parts where no active material exists are formed on both sides of the current collector between the positive and negative electrodes. Thereafter, the electrodes are connected in series to each other in a manner such that one polarity of an electrode is used as an opposite polarity in a neighboring cell. That is, as shown in FIG. 6, a plurality of electrodes are stacked in a manner such that electrodes having opposite polarities face each other with a separator being disposed therebetween. As shown in FIG. 6, an electrochemical cell 60 having a stacked quasi-bipolar structure includes negative active material layers 61 and 62, separators 63, positive active material layers 64, current collectors 65, and gaskets 66. Gaskets or an adhesive made of an electrically nonconductive material impermeable to electrolyte may be disposed at current collector extension parts and between electrodes and a case, so as to isolate electrolyte of unit cells from neighboring unit cells.

U.S. Pat. No. 3,167,456 discloses a structure in which both sides of an electrode are supported by a spacer used as an electrolyte isolation member instead of using a separator for supporting the electrode. U.S. Pat. Nos. 3,941,615 and 4,734,977 disclose structures in which an electrolyte isolation member and a separator are used. U.S. Pat. Nos. 4,504,556 and 4,964,878 disclose structures in which an electrolyte isolation member is not used between unit cells.

In such a stacking type quasi-bipolar structure, an electrolyte isolation member may not be used between unit cells, or electrically nonconductive electrolyte isolation member may be used between unit cells. Therefore, electrodes having the same polarity and stacked in a unit cell are not connected in parallel. Voltage variations in such a stacking type electrochemical cell having a quasi-bipolar will now be described with reference to FIG. 7.

FIG. 7 is a view for explaining voltage variations of a stacking type electrochemical cell having a quasi-bipolar structure in the related art. In FIG. 7, reference numerals 71, 72, 73, and 74 denote current collectors, an electrolyte isolation barrier wall, active material layers, and separators, respectively. The capacitance of one of the active material layers is 2C+Δ, and the capacitance of the others is 2C.

Referring to FIG. 7, electrodes disposed in a nonconductive barrier wall are stacked in two layers to form a two-series stacking type quasi-bipolar structure. If it is assumed that the electrochemical cell is an electric double layer capacitor for simplifying calculations, voltage variations of the electric double layer capacitor from a discharged state to a charged state may be calculated by Equations below.

$$V_1 = \frac{2(4C+\Delta)I_t}{C(16C+7\Delta)} \qquad \text{[Equation 1]}$$

$$V_2 = \frac{4(2C+\Delta)I_t}{C(16C+7\Delta)} \qquad \text{[Equation 2]}$$

$$V_3 = \frac{(8C+3\Delta)I_t}{C(16C+7\Delta)} \qquad \text{[Equation 3]}$$

$$V_4 = \frac{(8C+3\Delta)I_t}{C(16C+7\Delta)} \qquad \text{[Equation 4]}$$

As shown by Equations 1 to 4, if electrodes disposed in the barrier wall have different capacitances, voltage deviation occurs although the electrodes have the same polarity. In addition, if some of the electrodes stacked in the barrier wall are short-circuited, voltage deviation may occur. As described above, one of the most dominant limitations of a bipolar or quasi-bipolar structure is current leakage between unit cells caused by an electrode bridge between the unit cells. Furthermore, in the case of a stacking type quasi-bipolar structure, voltages of electrodes having the same polarity and disposed in a barrier wall can deviate due to current leakage caused by a partial electrolyte bridge. Such voltage deviation affects the lifespan and reliability of an electrochemical cell. That is, voltage equalization is necessary for the bipolar or quasi-bipolar structure due to its structural weakness. However, in the case of the stacking type quasi-bipolar structure, conductors should be connected to all electrodes disposed in each barrier wall for voltage equalization. This results in complicated structure and assembling.

DISCLOSURE OF INVENTION

Technical Problem

Accordingly, the present disclosure provides a stacking type quasi-bipolar electrochemical cell in which electrodes included in the same series are connected in parallel.

The present disclosure also provides a reliable stacking type quasi-bipolar electrochemical cell including an electric connection part through which an electrode can be connected to an external part for voltage equalization.

The present disclosure also provides an easy-to-manufacture and simple stacking type quasi-bipolar electrochemical cell.

The present disclosure also provides an easy-to-manufacture and simple stacking type quasi-bipolar electrochemical cell suitable for modularization and serial connection.

Technical Solution

According to an aspect, there is provided an electrochemical cell including: an electrode including a current collector, and positive and negative active material layers disposed at both sides of the current collector and spaced apart from each other with a current collector extension part being located therebetween, wherein a polarity of the electrode is used as an opposite polarity in a neighboring cell; an electrode assembly formed by stacking a plurality of electrodes including the electrode; and an electric connection part connecting some of the electrodes of the electrode assembly which are included in the same series, the electric connection part connecting the some electrodes in parallel.

According to another aspect, there is provided an electrochemical cell including: an electrode including a current collector, and positive and negative active material layers disposed at both sides of the current collector and spaced apart from each other with a current collector extension part being located therebetween, wherein a polarity of the electrode is used as an opposite polarity in a neighboring cell; a plurality of electrode assemblies formed by stacking a plurality of electrodes including the electrode; and at least one integral terminal including an electric connection part configured to connect two of the electrode assemblies in series, the integral terminal being used as a terminal of the two electrode assemblies connected in series.

ADVANTAGEOUS EFFECTS

The electrochemical cell of the present disclosure is reliable, simple, and easy-to-assemble. In addition, the electrochemical cell is simple and easy-to-assemble for modularization and serial connection.

MODE FOR THE INVENTION

Hereinafter, exemplary embodiments will be described in detail with reference to the accompanying drawings.

Figure 8:
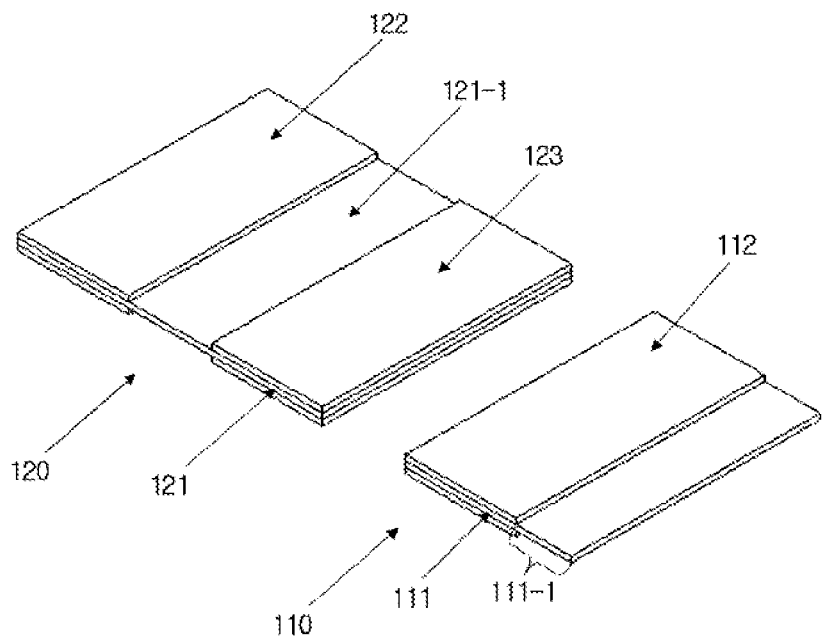
FIG. 8 is a perspective view illustrating electrodes of an electrochemical cell having a stacked structure according to an exemplary embodiment.

FIG. 8 is a perspective view illustrating stacking type electrodes of an electrochemical cell having a quasi-bipolar according to an exemplary embodiment.

Referring to FIG. 8, the electrochemical cell of the current embodiment includes a mono polar electrode 110 and a quasi-bipolar electrode 120.

The mono polar electrode 110 includes a current collector 111 having a foil shape and configured to be connected to an external terminal, a current collector extension part 111-1, and positive or negative active material layers 112 formed on the current collector 111. In the case where the active material layers 112 are formed on both sides of the current collector 111, the active material layers 112 have the same polarity and overlap each other with the current collector 111 being disposed therebetween. That is, the active material layers 112 have the same width and position.

The quasi-bipolar electrode 120 includes a foil shaped current collector 121, positive and negative active material layers 122 and 123 formed on both sides of the current collector 121 and spaced apart from each other, and a current collector extension part 121-1 located between the positive and negative active material layers 122 and 123. In a unit cell, such quasi-bipolar electrodes 120 are stacked in a manner such that surfaces of the quasi-bipolar electrodes 120 having opposite polarities are arranged to face each other with a separator being disposed therebetween. In this case, the remaining half parts of the quasi-bipolar electrodes 120 are used as opposite poles in neighboring unit cells. In the case where active material layers are formed on both sides of the current collector 121, the positive active material layers 122 are formed on both sides of the current collector 121 to have the same width and position, and the negative active material layers 123 are formed on both sides of the current collector 121 to have the same width and position. Generally, positive and negative active material layers of a quasi-bipolar electrode have the same width as that of positive and negative active material layers of a mono polar electrode.

If an electrochemical cell is an electric double layer capacitor, a current collector of the electrochemical cell may be formed of aluminum, and active carbon powder may be used as positive and negative active materials. In this case, the active carbon powder may be mixed with a binder, a conductive material, and a solvent to form slurry or paste, and the slurry or paste may be directly applied to the current collector to form active material layers. Alternatively, after fabricating an active material sheet, the active material sheet may be bonded to the current collector to form an electrode. In addition, like in the case of other electrochemical cell electrodes, a current collector material having an increased surface area through a predetermined surface treatment, such as an etched aluminum foil, may be used to form the current collector so as to easily attach an active material layer to the current collector. In most electric double layer capacitors, electrodes are not distinguished into positive and negative electrodes. However, in a general electrochemical cell, different active materials are used for positive and negative electrodes, and thus, electrodes are distinguished into positive and negative electrodes. Furthermore, different materials can be used for current collectors of positive and negative electrodes. In the case of a lithium ion battery, aluminum and copper are used as materials for current collectors. If current collectors are formed of different materials, electrodes may be previously fabricated and then bonded through a predetermined method such as welding to form a quasi-bipolar electrode. In this case, a bonding line may be located within a current collector extension part.

Figure 9:
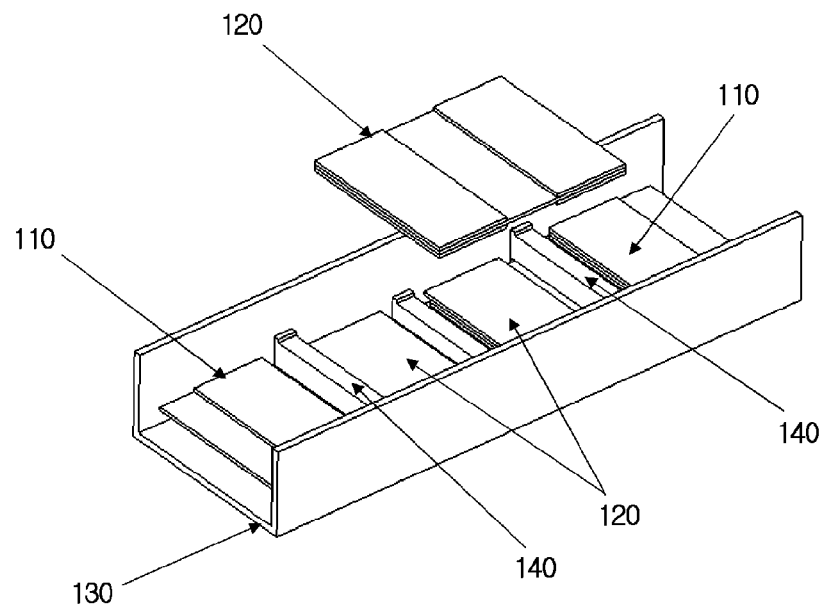
FIG. 9 is a view for illustrating stacking of electrodes in a case according to an exemplary embodiment.

FIG. 9 is a view for illustrating stacking of electrodes in a case according to an exemplary embodiment. A staking type four-series quasi-bipolar electrochemical cell is fabricated using electrodes similar to those illustrated in FIG. 8.

Figure 10:
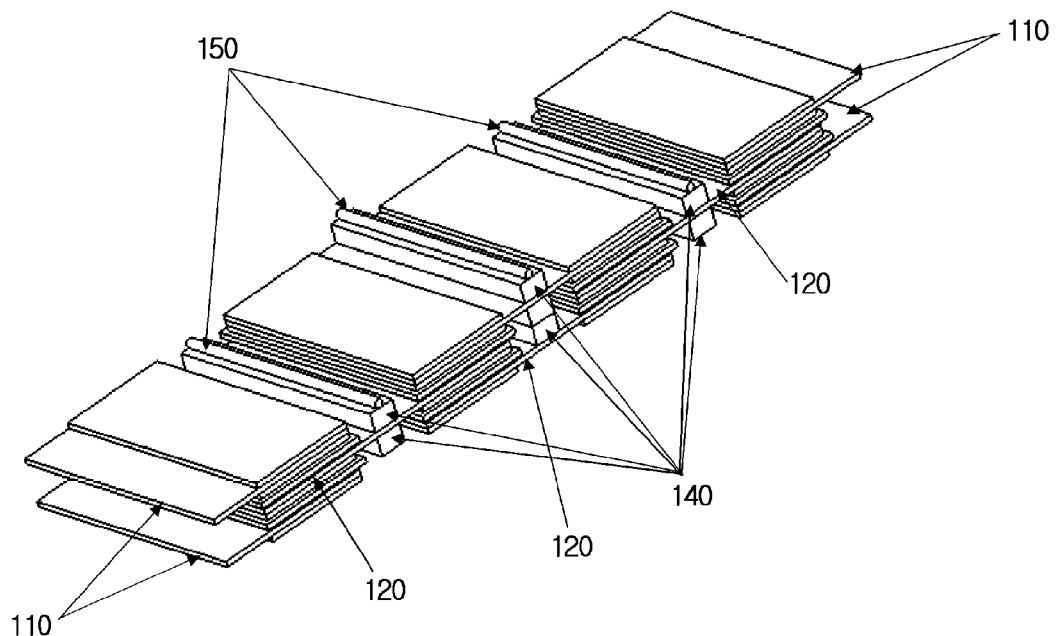
FIG. 10 is a view for illustrating a process of stacking electrodes in the case of FIG. 9.

FIG. 10 is a view for illustrating a process of stacking electrodes in the case of FIG. 9.

Referring to FIGS. 9 and 10, the electrochemical cell of the current embodiment includes a plurality of mono polar electrodes 110 and a plurality of quasi-bipolar electrodes 120 that have the same structure as those illustrated in FIG. 8. The electrochemical cell further includes a case 130 configured to accommodate the mono polar electrodes 110 and the quasi-bipolar electrodes 120.

Referring to FIG. 10, the mono polar electrodes 110 are disposed at left and right sides, and the left mono polar electrodes 110 have a polarity opposite to that of the right mono polar electrodes 110. The quasi-bipolar electrodes 120 are arranged in a manner such that an active layer of a quasi-bipolar electrode 120 is disposed on a side of a separator and an active layer of another mono polar or quasi-bipolar electrode 110 or 120 having an opposite polarity is disposed on the other side of the separator. Conductive strips 140 are disposed at current collector extension parts of the quasi-bipolar electrodes 120.

As shown in FIG. 10, the conductive strips 140 are disposed at the current collector extension parts of the quasi-bipolar electrodes 120 so that the current collector extension parts of neighboring quasi-bipolar electrodes can be electrically connected.

In more detail, as shown in FIG. 10, the mono polar electrodes 110 are connected in parallel to terminals (not shown). The first quasi-bipolar electrode 120 from the left mono polar electrodes 110 is disposed to face the left mono polar electrodes 110 and constitute a first series. The second quasi-bipolar electrodes 120 from the left mono polar electrodes 110 are stacked to face the first quasi-bipolar electrode 120 and constitute a second series. The third quasi-bipolar electrode 120 from the left mono polar electrodes 110 is disposed to face the second quasi-bipolar electrodes 120 and constitute a third series. The right mono polar electrodes 110 are disposed to face the third quasi-bipolar electrode 120 and constitute a fourth series. In the electrode assembly in which electrodes are stacked as described above, the first quasi-bipolar electrode 120 constituting the first series is electrically connected to other quasi-bipolar electrodes 120 (not shown) constituting the first series, and the second quasi-bipolar electrodes 120 constituting the second series are electrically connected to each other. The third quasi-bipolar electrode 120 constituting the third series is electrically connected to other quasi-bipolar electrodes 120 (not shown) constituting the third series. That is, the quasi-bipolar electrodes 120 constituting the same series are electrically connected to each other. Electrodes of the same series have the same polarity and may be stacked above the same position.

Thick conductive strips like the conductive strips 140 of FIG. 9 may be used. Alternatively, for more stable electric connection, a conductive adhesive 150 may be applied to the conductive strips 140 and than the conductive strips 140 may be attached to the current collector extension parts of the quasi-bipolar electrodes 120.

The conductive strips 140 may be formed of a metal. Alternatively, the conductive strips 140 may be formed of a conductive resin such as polyethylene or polypropylene containing conductive filler such as graphite powder or carbon fiber. In the case where the conductive strips 140 are formed of a metal, the conductive strips 140 may be formed of the same kind of metal as that used for forming current collectors, and the conductive strips 140 may be connected to the current collector extension parts by welding or soldering. In the case where the conductive strips 140 are formed of a thermoplastic resin such as polyethylene, the conductive strips 140 may be connected to the current collector extension parts by heat adhesion. Alternatively, current collector extension parts of quasi-bipolar electrodes 120 stacked on the same position may be connected to each other by using only a conductive adhesive without using the conductive strips 140.

Such electric connection materials as conductive strips and a conductive adhesive may also be used as electrolyte isolation parts between unit cells. In this case, the conductive strips and the conductive adhesive may be impermeable to electrolyte.

In this way, quasi-bipolar electrodes having the same polarity and stacked on the same position are connected in parallel to form a unit cell, and such unit cells are connected in series to each other.

Figure 7:
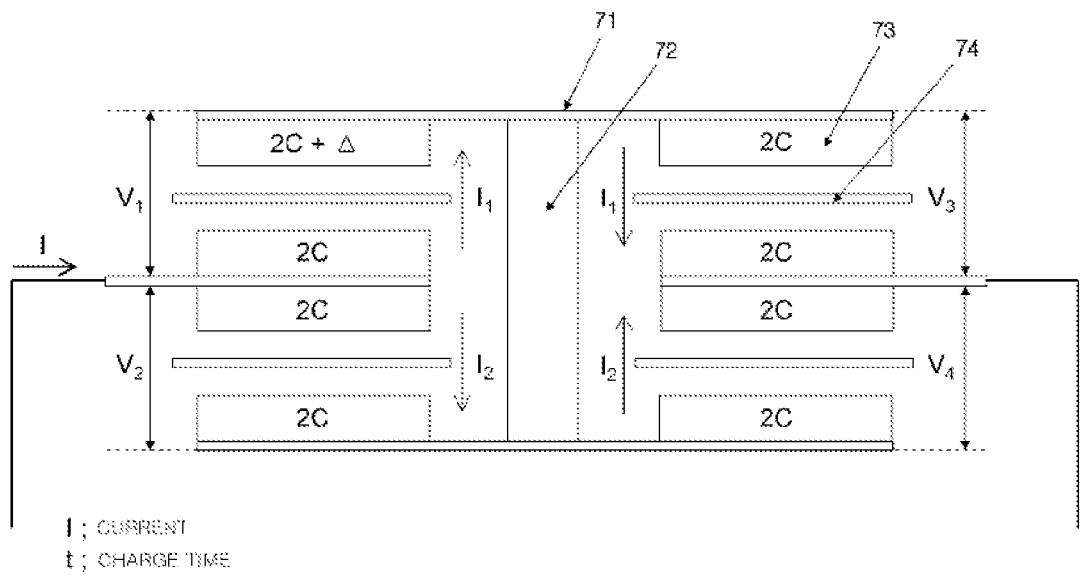
FIG. 7 is a view for explaining voltage variations of a stacking type electrochemical cell having a quasi-bipolar structure in the related art.

As described above, since quasi-bipolar electrodes having the same polarity are connected in parallel to each other in a unit cell, although the capacity of the quasi-bipolar electrodes varies locally, the effect of the local variation on the total capacity of the quasi-bipolar electrodes is small. Practically, owing to the small effect of the local capacity variation, voltage deviation reduces. If electrodes having the same polarity are not connected in parallel to each other as shown in FIG. 7, the active material layer having a capacity of $2C+\Delta$ may have a capacity deviation ratio of $\Delta/2C$. However, in FIG. 7, if the barrier wall is formed of a conductive material to connect the electrodes having the same polarity in parallel to each other, the capacity of the connected electrodes becomes $4C+\Delta$, and thus the capacity deviation ratio may reduce to $\Delta/4C$. That is, if electrodes having the same polarity are connected in parallel to each other, the capacity and voltage deviations of the electrodes can be reduced.

In general, capacity deviation values of electrodes are positive or negative with respect to the average capacity of the electrodes. Although the capacity of each electrode deviates from the average in some degree, the capacity of electrodes connected in parallel approaches the average capacity of the electrodes. Therefore, if electrodes having the same polarity are connected in parallel to form a unit cell and such unit cells are connected in series to form an electrochemical cell, the voltage deviation of the unit cells of the electrochemical cell may be low.

Furthermore, in the case where electrodes having the same polarity and stacked on the same position are connected in parallel to form a unit cell and such unit cells are connected in series to form an electrochemical cell, the voltage deviation of the unit cells connected in series may be not high although current leakage or a short circuit occurs at one or some of the electrodes.

As described above, quasi-bipolar electrodes having the same polarity and stacked on the same position are connected in parallel to each other to form a unit cell, and such unit cells are connected in series to each other to form an electrochemical cell, so as to reduce voltage deviation of the unit cells and improve the reliability of the electrochemical cell.

Furthermore, electric connection to the electrodes of the unit cells for voltage equalization of the unit cells can be simply and easily made by connecting only one conductive wire to each unit cell.

Quasi-bipolar electrodes stacked on the same position may be connected in parallel to each other in another method.

Figure 11:
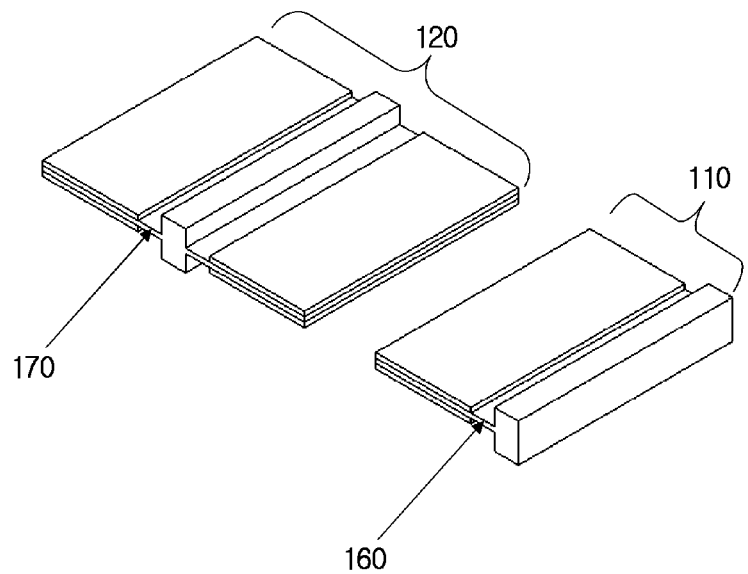
FIGS. 11 and 12 are perspective views illustrating electrodes including strip shaped integral current collectors.

For example, quasi-bipolar electrodes stacked on the same position may be connected in parallel to each other by using integral current collectors including conductive strips and current collectors as shown in FIG. 11.

As shown in FIG. 11, a mono polar electrode 110 may include a strip shaped current collector 160. A lateral end of the current collector 160 of the mono polar electrode 110 has a greater thickness than other portions to obtain the same structure as that of the conductive strip 140 disposed at a current collector extension part. Since mono polar electrodes are connected in parallel to a terminal, the structure illustrated in FIG. 11 may not be necessary for the mono polar electrodes.

A quasi-bipolar electrode 120 may include a strip shaped integral current collector 170. A current collector extension part of the current collector 170 of the quasi-bipolar electrode 120 may be entirely or partially increased in thickness as compared with other portions of the current collector 170 to obtain the same structure as that of the conductive strip 140 disposed at the current collector extension part.

Figure 12:
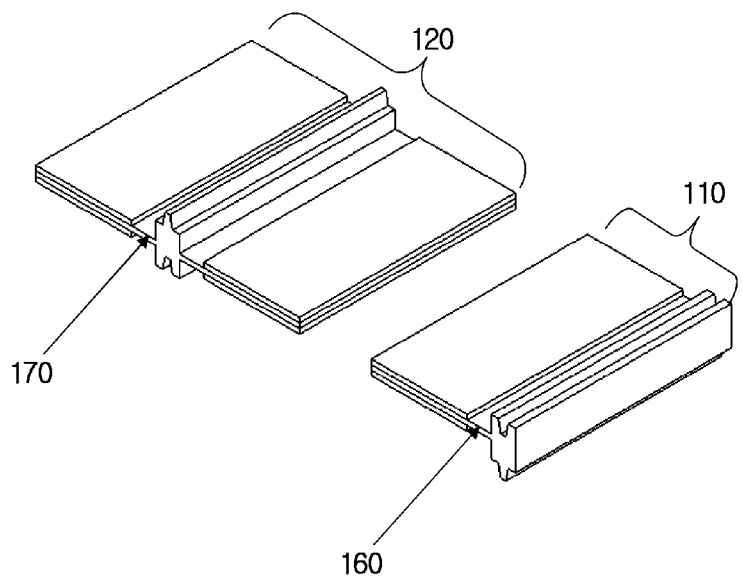

As shown in FIG. 12, thick portions of current collector extension parts of strip shaped integral current collectors 160 and 170 may have concave and convex top and bottom sides.

Figure 13:
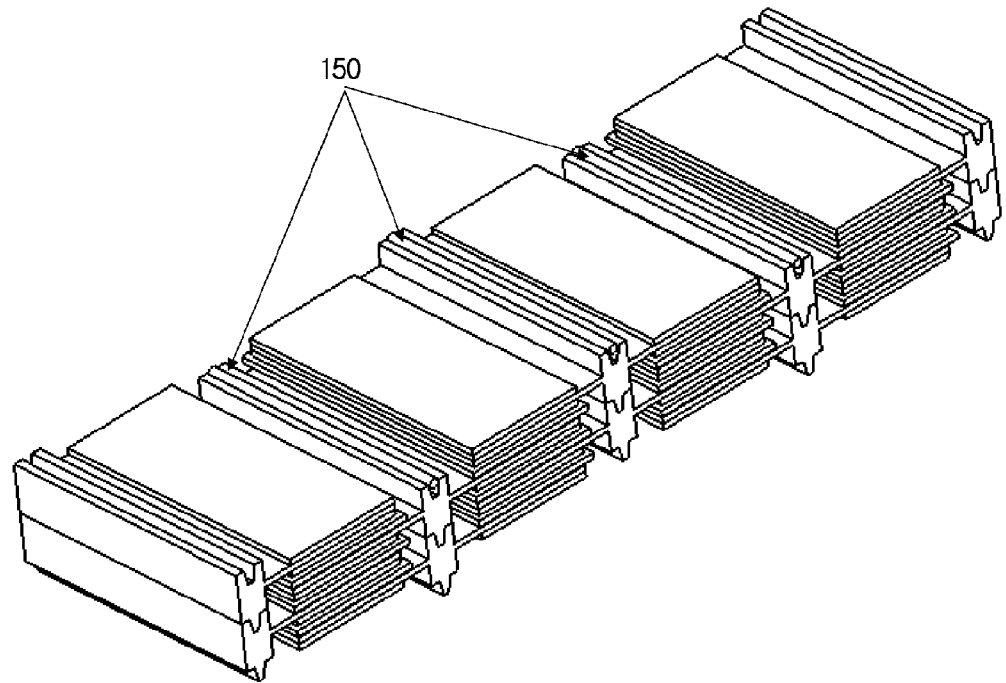
FIG. 13 is a perspective view illustrating a stacked state of electrodes of FIG. 12.

FIG. 13 is a perspective view illustrating a stacked state of electrodes illustrated in FIG. 12. An electrode assembly of a stacking type four-series quasi-bipolar electrochemical cell is illustrated.

As shown in FIG. 13, current collector extension parts of strip shaped integral current collectors 160 and 170 may be connected to each other by using welding, a conductive adhesive 150, or the like.

In the case of using strip shaped integral current collectors, when electrodes and separators are assembled into an electrode assembly, the electrodes can be arranged at predetermined positions, and thus precise assembling can be easily performed. In addition, a case including portions that can be engaged with the strip shaped integral current collectors may be used to accommodate the electrode assembly. In this case, the assembling process becomes easier, and as well the electrode assembly can be fixed to the case. Therefore, although the electrochemical cell vibrates, the electrode assembly can be stably disposed in the case without a movement relative to the case.

An external connection part may be connected to the electrode of the stacking type quasi-bipolar electrochemical cell to supply electrolyte to each unit cell or perform an electric operation such as voltage equalization.

Figure 14:
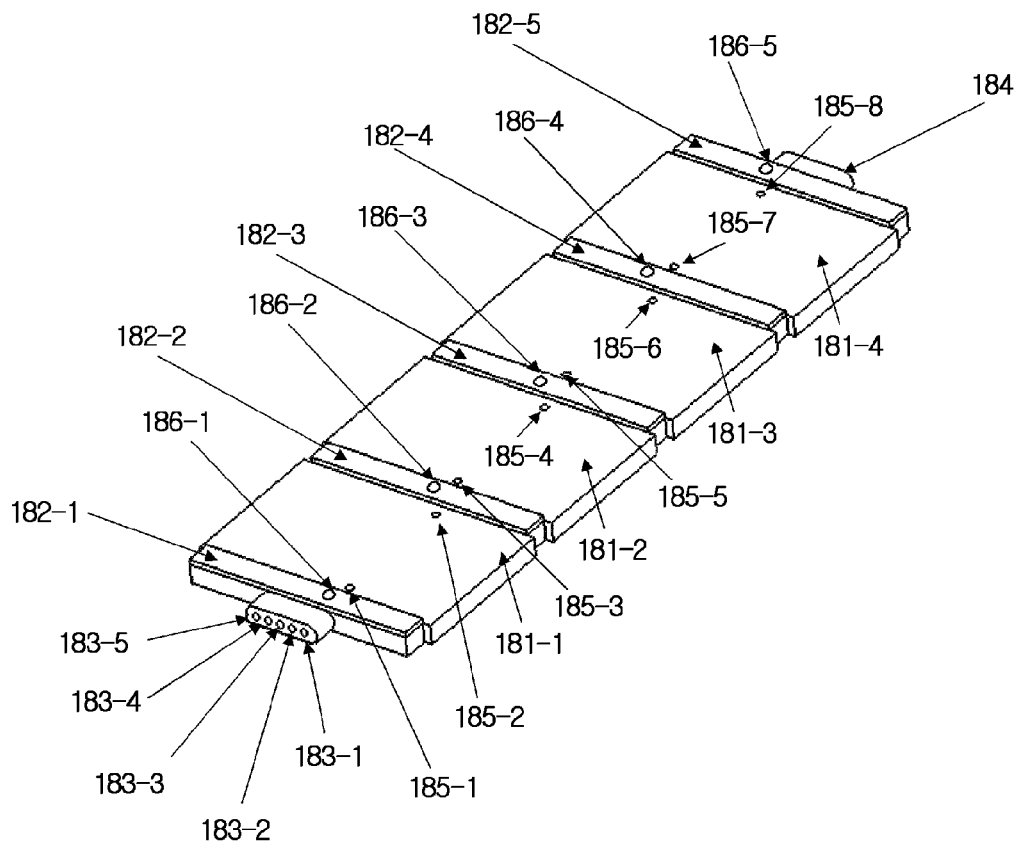
FIGS. 14 and 15 are perspective views illustrating a core configured to be installed at a lower side of a stacking type electrode assembly according to an exemplary embodiment.
Figure 15:
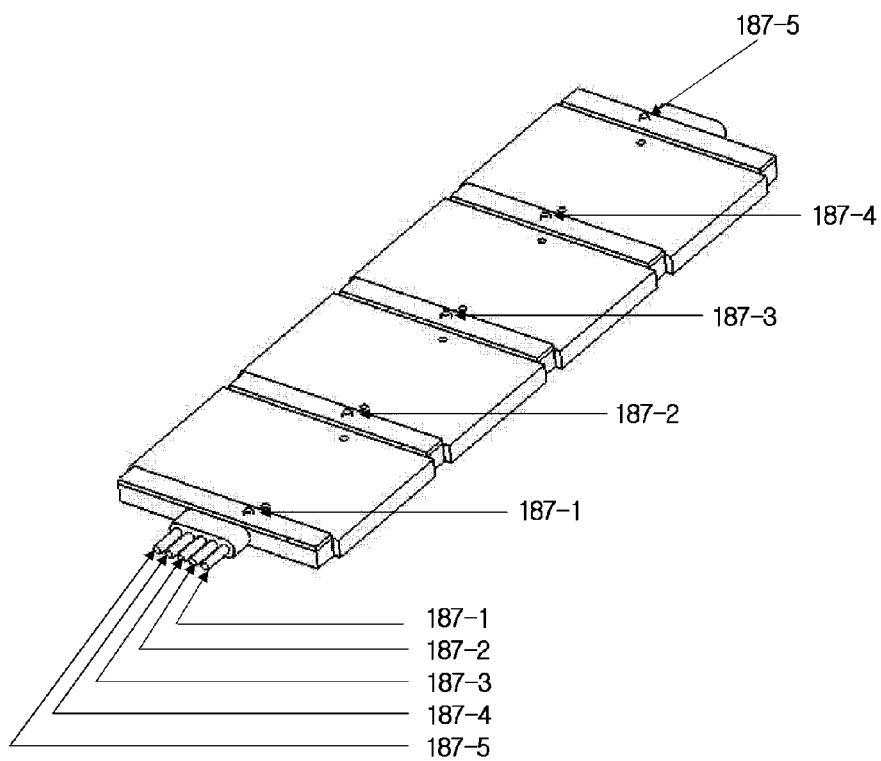

FIGS. 14 and 15 are perspective views illustrating a core configured to be installed at a lower side of a stacking type electrode assembly according to an exemplary embodiment.

Figure 1:
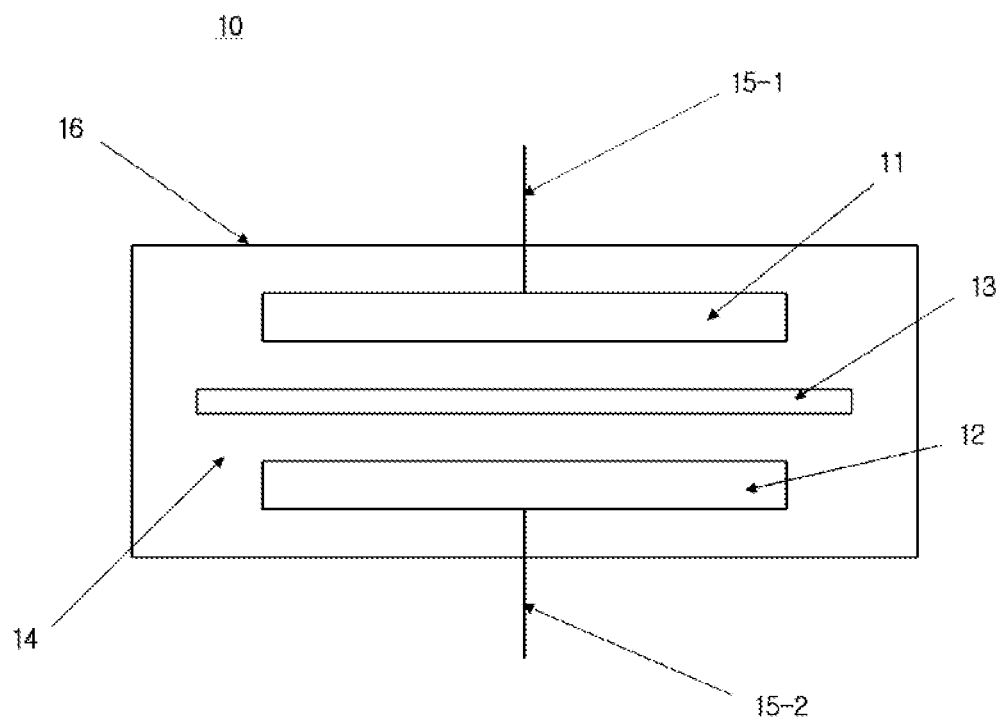
FIG. 1 illustrates an electrochemical cell of the related art.
Figure 2:
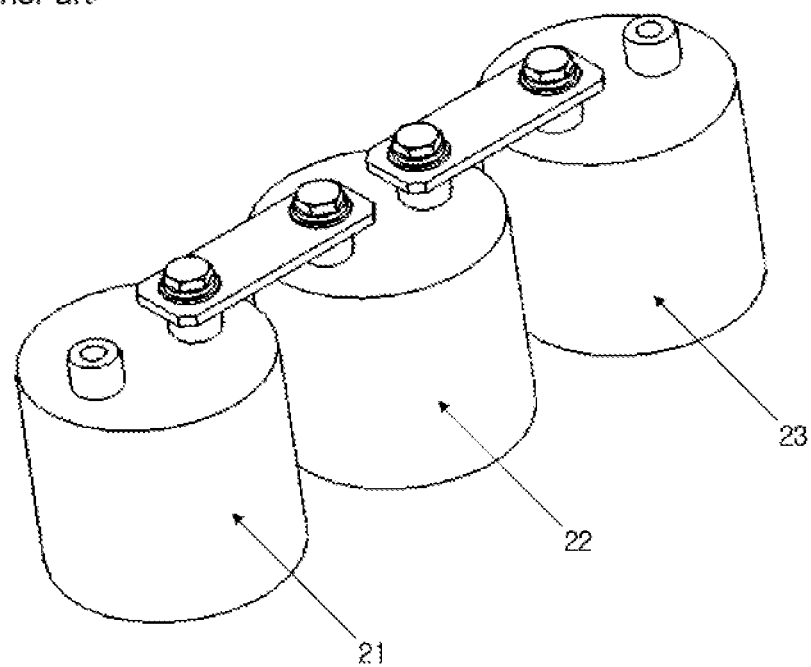
FIG. 2 illustrates unit cells connected in series to each other in the related art.
Figure 3:
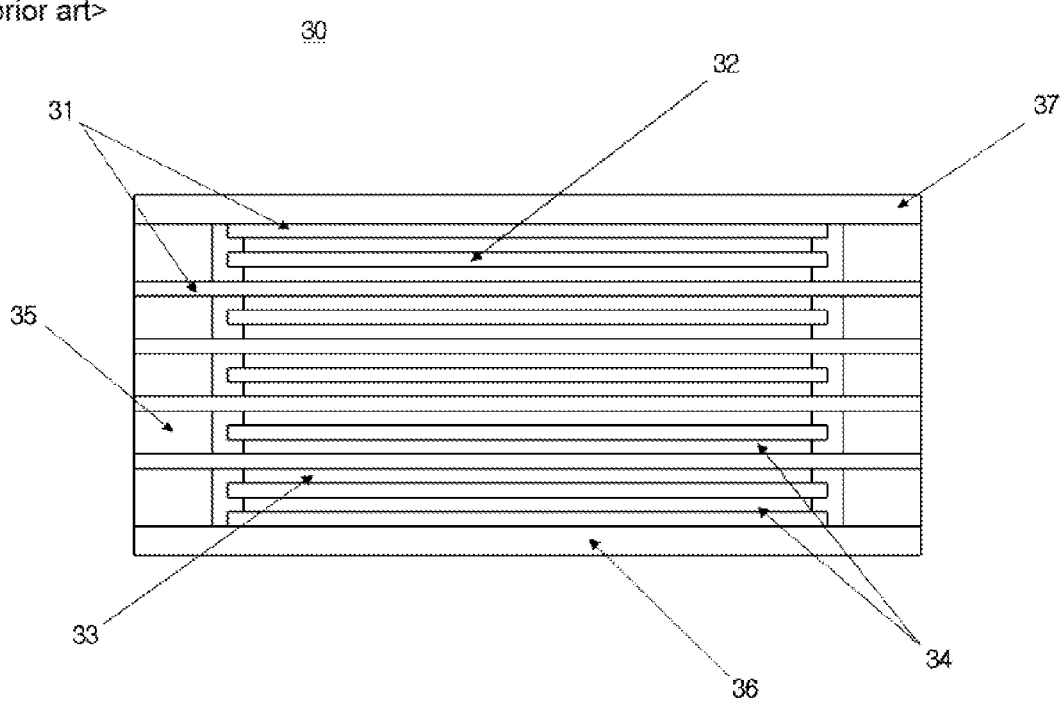
FIG. 3 is a cross-sectional view illustrating an electrochemical cell having a bipolar structure in the related art.
Figure 4:
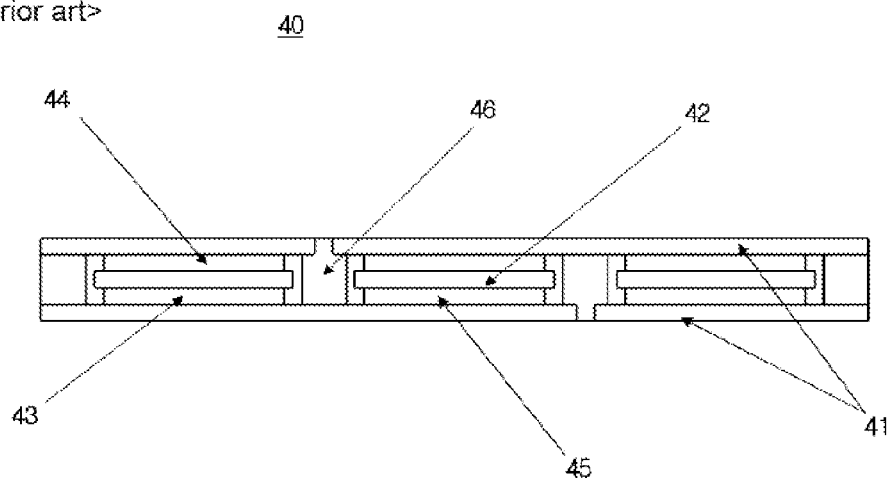
FIG. 4 is a cross-sectional view illustrating an electrochemical cell having a quasi-bipolar structure in the related art.
Figure 5:
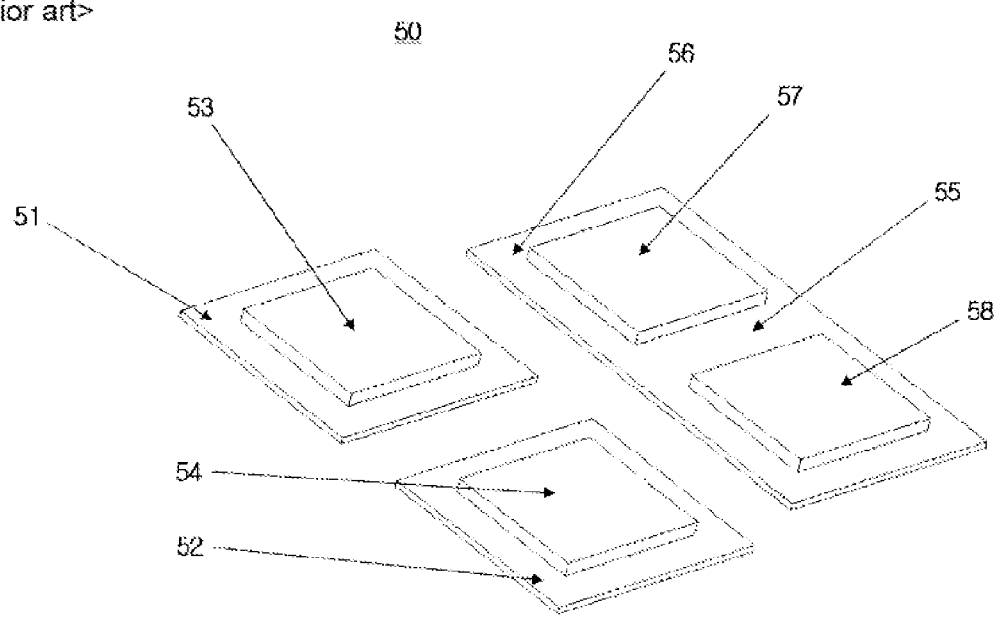
FIG. 5 is a perspective view illustrating an electrode of an electrochemical cell having a quasi-bipolar structure in the related art.
Figure 6:
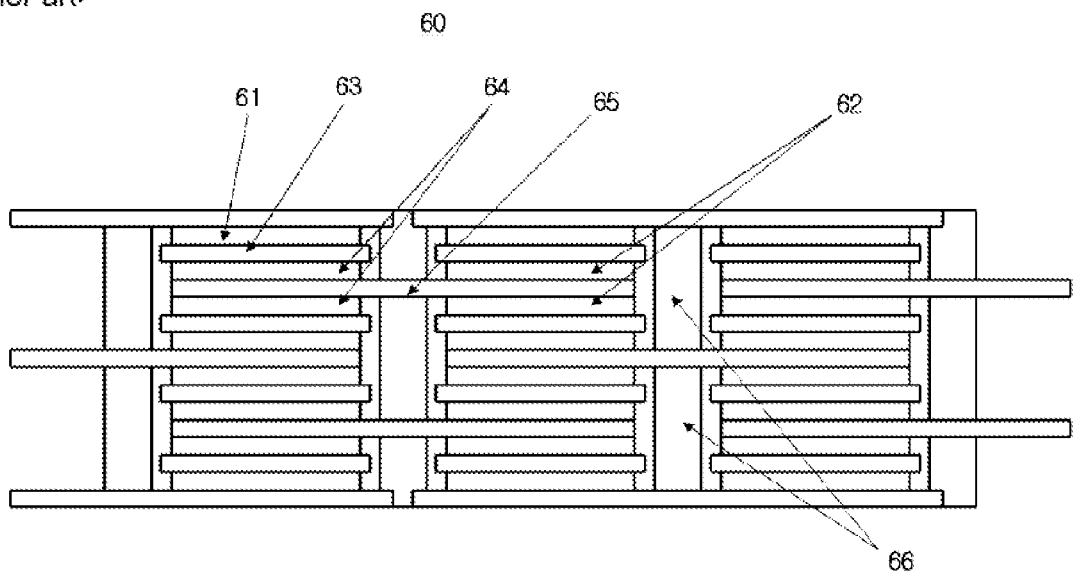
FIG. 6 is a cross-sectional view illustrating an electrochemical cell having a stacked quasi-bipolar structure in the related art.

Referring to FIG. 4, the core is configured to be installed at a lower side of an electrode assembly assembled as shown in FIG. 10 or 13. The core includes a first unit cell region 181-1 assigned to electrodes of a first unit cell, a second unit cell region 181-2 assigned to electrodes of a second unit cell, a third unit cell region 181-3 assigned to electrodes of a third unit cell, and a fourth unit cell region 181-4 assigned to electrodes of a fourth unit cell.

The core 180 of an electrochemical cell further includes a first conductive strip 182-1 attached to a side of the first unit cell region 181-1, a second conductive strip 182-2 attached between the first and second unit cell regions 181-1 and 181-2, a third conductive strip 182-3 attached between the second and third unit cell regions 181-2 and 181-3, a fourth conductive strip 182-4 attached between the third and fourth unit cell regions 181-3 and 182-4, and a fifth conductive strip 182-5 attached to a side of the fourth unit cell region 181-4.

The first conductive strip 182-1 and the fifth conductive strip 182-5 are configured to be connected mono polar electrodes connected to terminals. The first conductive strip 182-1 and the fifth conductive strip 182-5 are optional strips because direct connection to exposed terminals is possible.

Five conductive wire holes 183-1 to 183-5 are formed in a center portion of the core 180 at a side of the first conductive strip 182-1 for inserting conductive wires.

An electrolyte injection hole 184 is formed in a center portion of the core 180 at a side of the fifth conductive strip 182-5 for injecting electrolyte.

Two electrolyte injection holes 185-1 and 185-2 are formed in the first unit cell region 181-1 and connected to the electrolyte injection hole 184. Electrolyte injected through the electrolyte injection hole 184 is introduced into a first unit cell through the electrolyte injection holes 185-1 and 185-2.

Two electrolyte injection holes 185-3 and 185-4 are formed in the second unit cell region 181-2 and connected to the electrolyte injection hole 184. Electrolyte injected through the electrolyte injection hole 184 is introduced into a second unit cell through the electrolyte injection holes 185-3 and 185-4.

Two electrolyte injection holes 185-5 and 185-6 are formed in the third unit cell region 181-3 and connected to the electrolyte injection hole 184. Electrolyte injected through the electrolyte injection hole 184 is introduced into a third unit cell through the electrolyte injection holes 185-5 and 185-6.

Two electrolyte injection holes 185-7 and 185-8 are formed in the fourth unit cell region 181-4 and connected to the electrolyte injection hole 184. Electrolyte injected through the electrolyte injection hole 184 is introduced into a fourth unit cell through the electrolyte injection holes 185-7 and 185-8.

When assembled, the electrolyte injection holes 185-1 to 185-8 are located within current collector extension parts of electrodes of an electrode assembly.

A connection hole 186-1 is formed in the core 180 under the first conductive strip 182-1 and connected to the conductive wire hole 183-1.

A connection hole 186-2 is formed in the core 180 under the second conductive strip 182-2 and connected to the conductive wire hole 183-2.

A connection hole 186-3 is formed in the core 180 under the third conductive strip 182-3 and connected to the conductive wire hole 183-3.

A connection hole 186-4 is formed in the core 180 under the fourth conductive strip 182-4 and connected to the conductive wire hole 183-4.

A connection hole 186-5 is formed in the core 180 under the fifth conductive strip 182-5 and connected to the conductive wire hole 183-5.

As shown in FIG. 15, a first conductive wire 187-1 inserted through the conductive wire hole 183-1 is connected to the first conductive strip 182-1 through the connection hole 186-1. When assembled, the first conductive strip 182-1 is connected to a current collector extension part 111-1 of a mono polar electrode 110 of a first unit cell that is connected to a terminal.

A second conductive wire 187-1 inserted through the conductive wire hole 183-2 is connected to the second conductive strip 182-2 through the connection hole 186-2. When assembled, the second conductive strip 182-2 is connected to a current collector extension part 121-1 of a quasi-bipolar electrode 120 disposed across the second conductive strip 182-2.

A third conductive wire 187-3 inserted through the conductive wire hole 183-3 is connected to the third conductive strip 182-3 through the connection hole 186-3. When assembled, the third conductive strip 182-2 is connected to a current collector extension part 121-1 of a quasi-bipolar electrode 120 disposed across the third conductive strip 182-3.

A fourth conductive wire 187-4 inserted through the conductive wire hole 183-4 is connected to the fourth conductive strip 182-4 through the connection hole 186-4. When assembled, the fourth conductive strip 182-4 is connected to a current collector extension part 121-1 of a quasi-bipolar electrode 120 disposed across the fourth conductive strip 182-4.

A fifth conductive wire 187-5 inserted through the conductive wire hole 183-5 is connected to the fifth conductive strip 182-5 through the connection hole 186-5. When assembled, the fifth conductive strip 182-5 is connected to a current collector extension part 111-1 of a mono polar electrode 110 of a fourth unit cell that is connected to a terminal. Although an electrolyte injection hole is not formed at the conductive wire hole 183-5 through which the fifth conductive wire 187-5 is inserted, electrolyte injection holes are formed at the conductive wire holes through which the first to fourth conductive wires 187-1 to 187-4 are inserted.

The electrolyte injection hole and the connection hole formed at the same conductive wire hole can be replaced with a long hole.

In the current embodiment, conductive strips and conductive wires may be formed of a metal such as aluminum and copper. For example, the conductive strips and the conductive wires may be formed of the same kind of material as that used for forming current collectors. The conductive strips and the conductive wires may be bonded by a method such as welding. In stead of using the conductive strips, the conductive wires may be used in a manner such that ends of the conductive wires protrude outward from the core, or ends of the conductive wires protruding outward from the core may be used instead of the conductive strips. The conductive strips may be attached to the surface of the core 180 using an adhesive material such as an adhesive or a tape.

The core 180 may be formed of a resin such as a thermoplastic resin, a thermosetting resin, and epoxy. Alternatively, the core 180 may be formed of a metal such as aluminum. In the case where the core 180 is formed of a metal, conductive wires coated with a protective insulation material such as a thermoplastic resin may be inserted in the core 180. The surface of the core 180 may be protected with a film or coating such as polyethylene, polypropylene, PTFE (Polytetrafluoroethylene), and PPS (polyphenylene sulfide) films/coatings, so as to improve electrochemical characteristics. An adhesive layer may be formed on the surface of the core 180 using a material such as an adhesive, a tape, a thermoplastic resin film so as to fix electrodes to the core. A method or part may be used to increase a bonding strength between the core and electric connection parts disposed on the core between unit cells. The electric connection parts include a conductive adhesive material and may also be used as electrolyte isolation parts. For example, in the case where a conductive polyethylene including filler such as graphite powder or carbon fiber is used to form the electric connection parts, the core 180 may be coated with a polyethylene film, and after the core is coupled with an electrode assembly, the electrode assembly may be dried at a temperature equal to or higher than the melting point of polyethylene, so as to increase the bonding strength between the core and the electric connection parts. In the case where the core 180 is formed of a metal such as aluminum, an insulation layer may be formed on the surface of the 180 for electric insulation.

Figure 16:
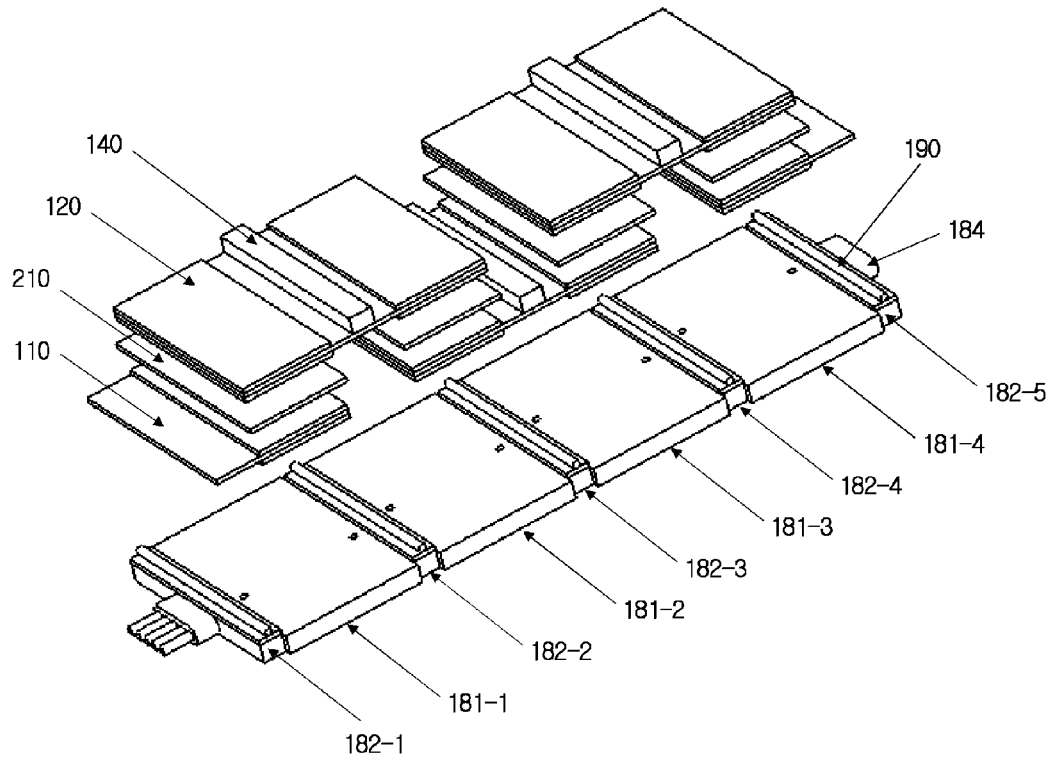
FIG. 16 is an exploded perspective view illustrating stacking type electrodes and the core of FIG. 15 according to an exemplary embodiment.

FIG. 16 is an exploded perspective view illustrating stacking type electrodes and the core of FIG. 15 according to an exemplary embodiment. An electrochemical cell is assembled using a core including conductive strips to connect conductive wires to electrodes of unit cells.

Referring to FIG. 16, a conductive adhesive 190 is applied to top sides of the first to fifth conductive strips 182-1 to 182-5 of the core 180 that are configured to be connected to current collector extension parts 111-1 of mono polar electrodes and current collector extension parts 121-1 of quasi-bipolar electrodes. Therefore, the current collector extension parts 111-1 of the mono polar electrodes and the current collector extension parts 121-1 of the quasi-bipolar electrodes can be electrically connected to corresponding conductive strips through the conductive adhesive 190. Alternatively, the current collector extension parts 111-1 of the mono polar electrodes and the current collector extension parts 121-1 of the quasi-bipolar electrodes can be electrically connected to the conductive strips 182-1 to 182-5 of the core by welding or soldering instead of using the conductive adhesive 190.

Separators 210 are disposed between active material layers of electrodes having opposite polarities and facing each other.

The conductive strips 140 are disposed at the current collector extension parts 121-1 of the quasi-bipolar electrodes so that quasi-bipolar electrodes having the same polarity and stacked on the same position can be connected in parallel to each other, and the conductive strips 140 may be used as electrolyte isolation parts between unit cells. The conductive strips 140 may be attached to the current collector extension parts of the quasi-bipolar electrodes by using an adhesive material so as to obtain stable electric connection and increase electrolyte isolation effect.

Figure 17:
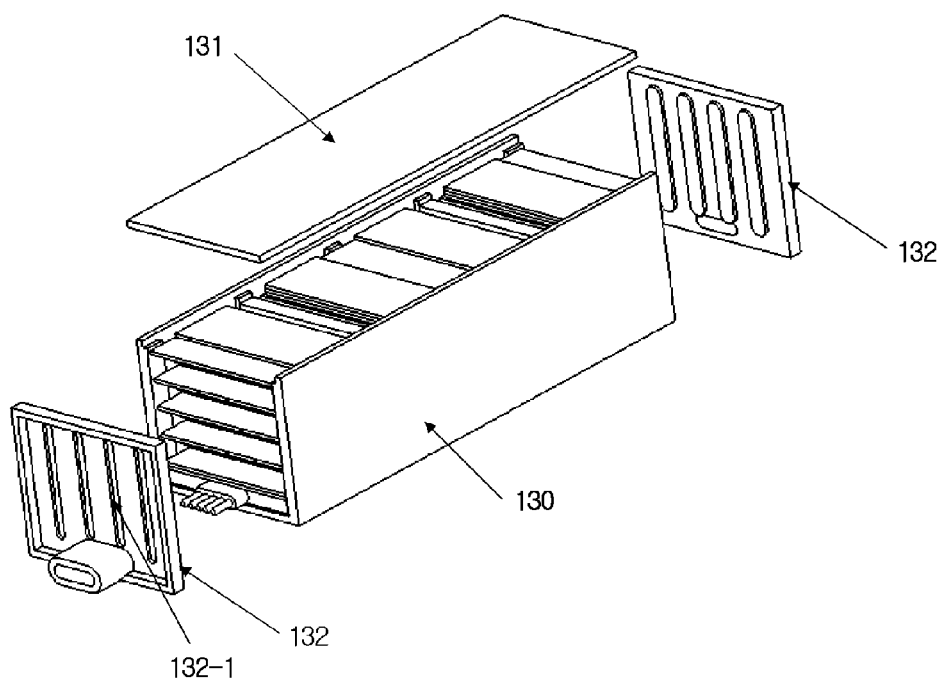
FIG. 17 is a perspective view for illustrating a process of assembling an electrochemical cell by placing the core and the stacking type electrodes assembled as shown in FIG. 16 into a case according to an exemplary embodiment.

FIG. 17 is a perspective view for illustrating a process of assembling an electrochemical cell by placing the core and the stacking type electrodes assembled as shown in FIG. 16 into a case according to an exemplary embodiment.

Figure 18:
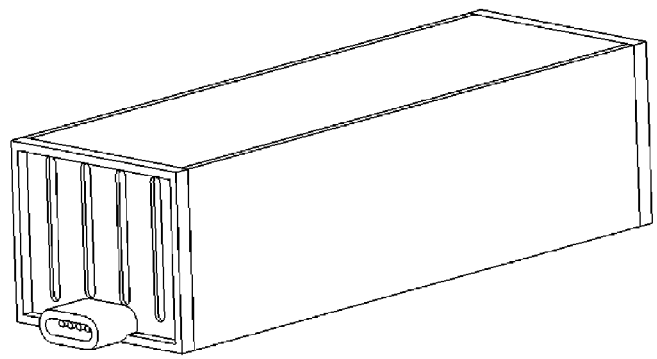
FIG. 18 is a perspective view illustrating an electrochemical cell according to an exemplary embodiment.

FIG. 18 is a perspective view illustrating an electrochemical cell according to an exemplary embodiment.

Referring to FIG. 17, the core 180 and the staking type electrodes assembled as shown in FIG. 16 are placed in a case 130, and a cover 131 is placed on the top side of the case 130. Both opened sides of the case 130 are sealed by terminals 132. After attaching the terminals 132 to both sides of the case 130, laser beams are cast to grooves 132-1 of the terminals 132 to connect the terminals 132 to current collector extension parts 111-1 of mono polar electrodes 110 of outer unit cells.

Owing to this structure, although electrolyte isolation parts are installed between unit cells, the unit cells can be connected to each other through connection holes or electrolyte injection holes connected to conductive wire holes. Therefore, the same pressure is applied to the unit cells, and thus no external force may be applied to the electrolyte isolation parts. Accordingly, the electrolyte isolation parts can be easily formed and reliably used. Furthermore, a safety vent can be installed at an electrolyte injection port of the case, and in this case, additional safety vents are not necessary. A gas-permeable membrane can be installed at the electrolyte injection port of the case to prevent a pressure surge inside the electrochemical cell caused by gas generated during an operation of the electrochemical cell. The gas-permeable membrane can be used as a rupture plate together with the safety vent.

Figure 19:
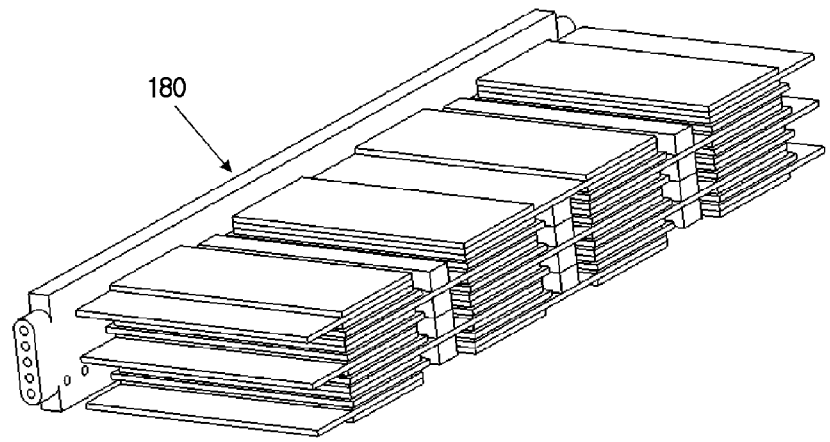
FIG. 19 is a perspective view illustrating stacking type electrodes and a core attached to a side of the stacking type electrodes according to an exemplary embodiment.

FIG. 19 is a perspective view illustrating stacking type electrodes and a core attached to a side of the stacking type electrodes according to an exemplary embodiment.

As shown in FIG. 19, the core 180 illustrated in FIG. 15 can be attached to a side of stacking type electrodes.

Figure 20:
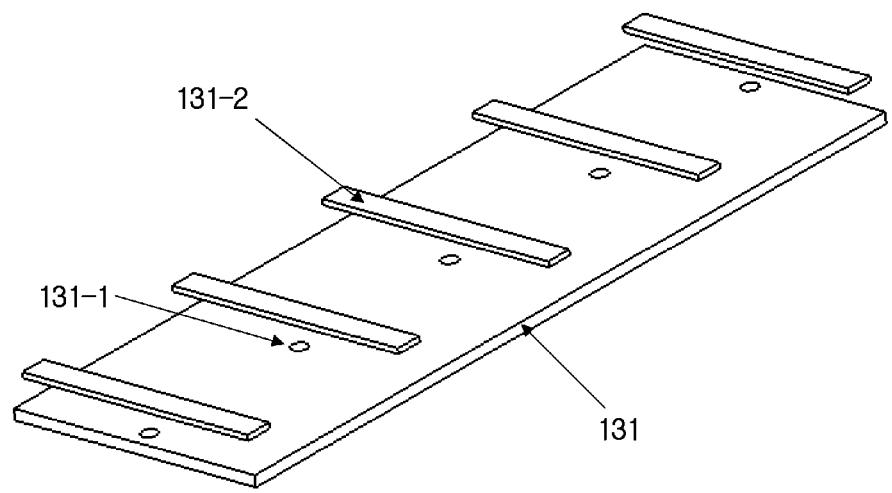
FIG. 20 is a perspective view illustrating a cover of an electrochemical cell according to an exemplary embodiment.

FIG. 20 is a perspective view illustrating a cover of an electrochemical cell according to an exemplary embodiment.

As shown in FIG. 20, five holes 131-1 are formed in a cover 131 at regular intervals. Five conductive strips 131-2 formed of a conductive material such as aluminum and copper may be evenly attached to the cover 131 at the positions of the five holes 131-1, respectively. The holes 131-1 are used as electrode connection ports.

In an assembled state, the holes 131-1 are aligned with current collector extension parts of quasi-bipolar electrodes and current collector extension parts 111-1 of outer mono polar electrodes 110 of a stacking type electrode assembly. Since the mono polar electrodes are connected to terminals as described above, the conductive strips attached at positions corresponding to the current collector extension parts of the mono polar electrode electrodes may be omitted.

After a conductive adhesive is applied to the conductive strips 131-2 of the cover 131, the cover 131 is placed on the top side of the case 130. Then, the conductive strips 131-2 of the cover 131 are positioned inside the case 130.

In this state, the conductive strips 131-2 of the cover 131 are connected to the current collector extension parts of the quasi-bipolar electrodes and the current collector extension parts 111-1 of the outer mono polar electrodes 110 of the stacking type electrode assembly. That is, the conductive strips 131-2 are electrically connected to electrodes of unit cells in which electrodes having the same polarity are connected in parallel.

As described above, the holes 131-1 used as electrode connection ports are formed in the cover 131, and the conductive strips 131-2 are attached to the cover 131. In this case, it is unnecessary to insert the conductive wires 187-1 to 187-5 into the core 180 to use the conductive wires 187-1 to 187-5 for a voltage equalizing operation.

Figure 21:
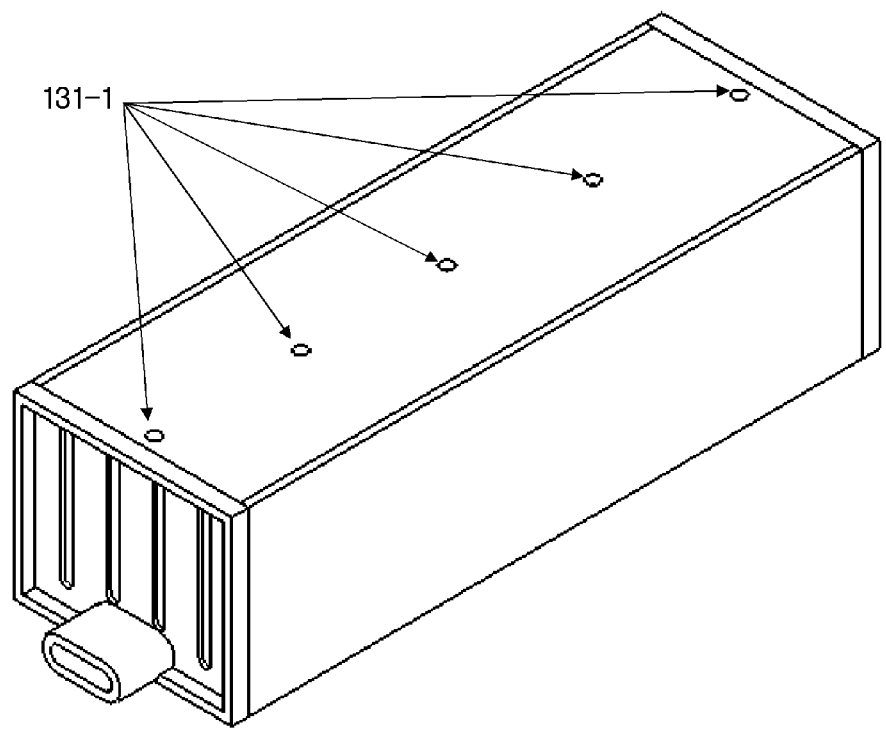
FIG. 21 is a perspective view illustrating an electrochemical cell in which the top side of a case is covered with the cover of FIG. 20 according to an exemplary embodiment.

FIG. 21 is a perspective view illustrating an electrochemical cell in which the top side of a case is covered with the cover illustrated in FIG. 20 according to an exemplary embodiment.

As shown in FIG. 21, the top side of the case 130 is covered with the cover 131 of FIG. 20 with the conductive strips 131-2 of the cover 131 being oriented to the inside of the case 130. Thus, the five holes 131-1 of the cover 131 can be exposed to be used as electrode connection ports.

An explanation will now be given on a stacking type quasi-bipolar electrochemical cell in which electrodes are stacked in a different method from the above-described method.

Figure 22:
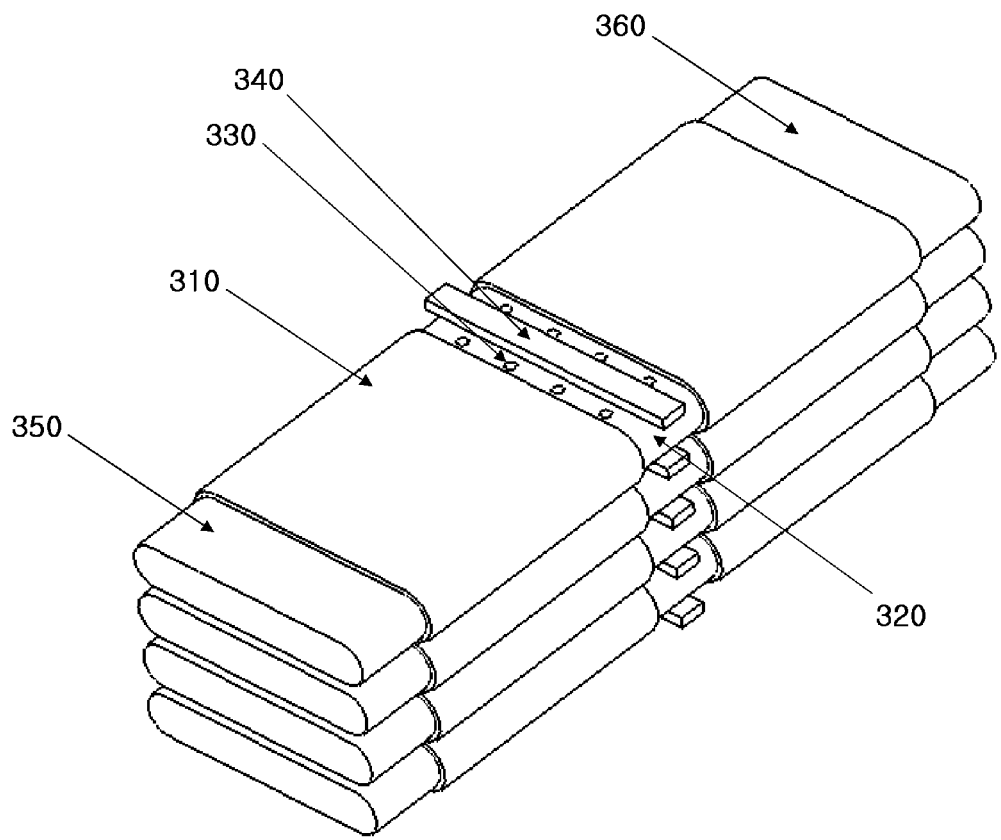
FIG. 22 is a perspective view illustrating an electrode assembly formed by stacking winding type two-series quasi-bipolar electrode assemblies according to an exemplary embodiment.

FIG. 22 is a perspective view illustrating an electrode assembly formed by stacking wing type two-series quasi-bipolar electrode assemblies according to an exemplary embodiment.

In FIG. 22, the winding type two-series quasi-bipolar electrode assembly includes: two mono polar electrodes having opposite polarities and each including a current collector, an active material layer formed on the current collector, and a current collector extension part; a quasi-bipolar electrode including a current collector, opposite active material layers formed on both sides of a surface of the current collector, and a current collector extension part between the active material layers; and a separator. The two mono polar electrodes, the quasi-bipolar electrode, and the separator are wound together to form the winding type two-series quasi-bipolar electrode assembly. Electrolyte injection holes 330 may be formed in a current collector extension part 320 of a quasi-bipolar electrode to inject electrolyte into a winding type electrode assembly 310 through the electrolyte injection holes 330.

Winding type quasi-bipolar electrode assemblies prepared as described above are stacked, and current collector extension parts 320 of quasi-bipolar electrodes of the stacked winding type quasi-bipolar electrode assemblies are connected in parallel to each other by disposing an electric connection material such as conductive strips 340 or a conductive adhesive between the current collector extension parts 320, so that parallel unit cells can be connected in series. Therefore, in a unit cell, the same voltage can be applied to electrodes having the same polarity, and thus voltage deviations of unit cells can be reduced as described above. In FIG. 22, reference numeral 350 and 360 current collector extension parts of mono polar electrodes.

Structures for modularizing an electrochemical cell based on a quasi-bipolar structure are described in the above. The number of series of a modularized electrochemical cell is limited. That is, it is practically difficult to modularize several tens or hundreds of unit cells in series by using a quasi-bipolar structure. Therefore, it is necessary to connect a modularized electrochemical cell having a quasi-bipolar structure to the outside like the case of a mono polar electrode. In the following description, an explanation will be given on a method of connecting modularized quasi-bipolar electrochemical cells in series.

Generally, mono polar electrochemical cells are connected in series by using series connection parts such as bus bars and screws, or other methods such as resist welding, laser welding, and soldering. Modularized quasi-bipolar electrochemical cells can be connected in the same manner. However, other series connection methods are necessary to make use of the advantageous low-resistance property of the quasi-bipolar structure and ensure high reliability.

Figure 23:
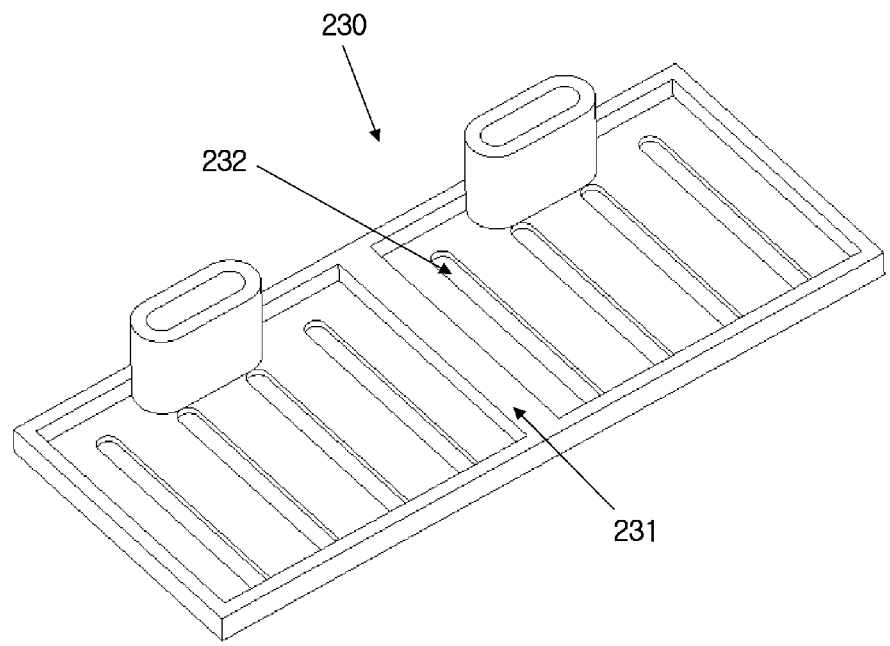
FIG. 23 is a perspective view illustrating an integral terminal for a modularized electrochemical cell according to an exemplary embodiment.

FIG. 23 is a perspective view illustrating an integral terminal for a modularized electrochemical cell according to an exemplary embodiment.

As shown in FIG. 23, in the current embodiment, an integral terminal 230 for a modularized electrochemical cell includes a terminal connection part 231 at a middle part thereof. That is, it can be considered that the integral terminal 230 is formed by connecting two terminals such as the terminals 132 shown in FIG. 17 through the terminal connection part 231. Grooves 232 such as the grooves 132-1 of the terminal 132 of FIG. 17 are formed in the integral terminal 230 at regular intervals.

Therefore, according to the current embodiment, when modularized electrochemical cells are connected in series, additional welding or screwing may be unnecessary. This method can be used for connecting all modularized electrochemical cells in series, or connecting some of electrochemical cells in series during a modularization process.

Figure 24:
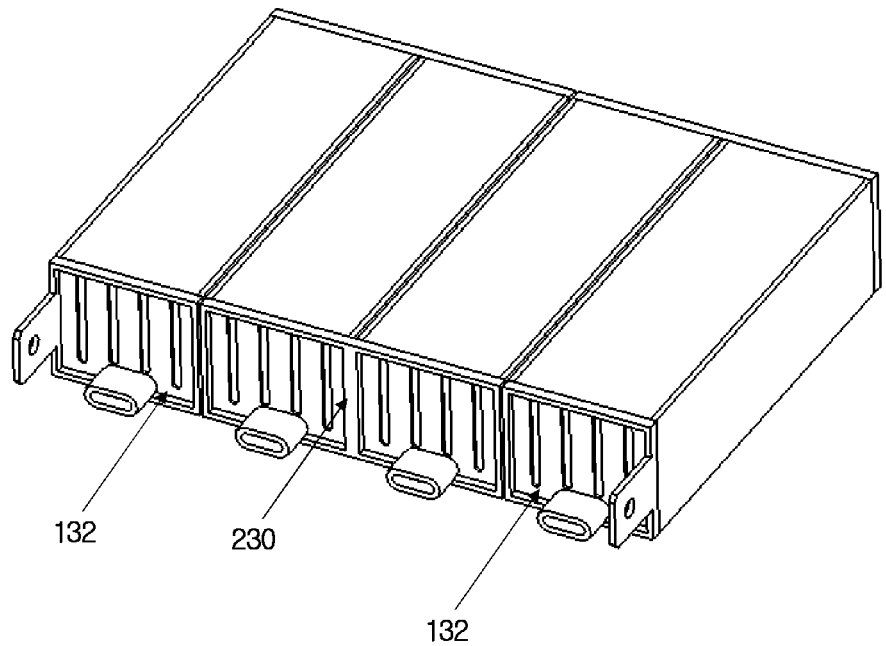
FIGS. 24 and 25 are perspective views illustrating modularized electrochemical cells according to other exemplary embodiments.
Figure 25:
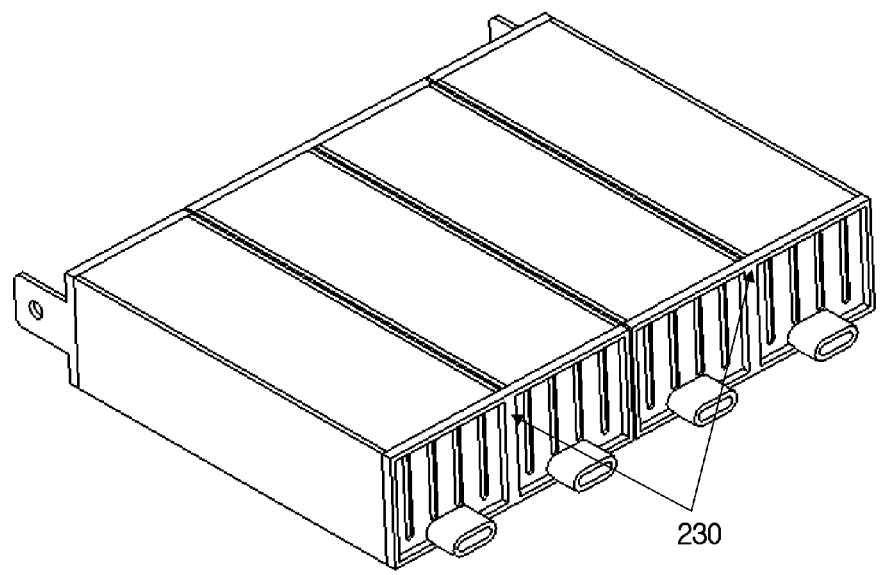

FIGS. 24 and 25 are perspective views illustrating modularized electrochemical cells according to other exemplary embodiments. Four electrochemical cells are connected in series using the integral terminal of FIG. 23.

As shown in FIG. 24, two independent terminals 132 and one integral terminal 230 are attached to one side of the modularized electrochemical cells. In detail, the integral terminal 230 is attached to one side of the intermediate two electrochemical cells of the modularized four electrochemical cells, and the independent terminals 132 are attached to one side of the outer two electrochemical cells.

Referring to FIG. 25, two integral terminals 230 are attached to the other side of the modularized electrochemical cells.

As described above, four electrochemical cells are connected in series using integral terminals, thereby providing an easy-to-assemble and simple structure.

In the above-described descriptions, an electric double layer capacitor, a kind of ultracapacitor, is illustrated as an example for explaining an electrochemical cell of the present invention; however, the present invention is not limited to the electric double layer capacitor. For example, the present invention can be applied to other electrochemical cells such as a battery using liquid electrolyte, an ultracapacitor, and an aluminum electrolyte capacitor.

As described above, embodiments provides a modularized stacking type electrochemical cell having a quasi-bipolar structure, which can be applied to an ultra-capacitor such as an electric double layer capacitor, and to other electric energy storage devices such as a lead acid battery, a NiMH battery, a NiCd battery, a lithium ion battery, and an aluminum electrolytic capacitor.

While structures, operations, manufacturing methods have been particularly shown and described with reference to exemplary embodiments, it will be understood by those of ordinary skill in the art that various changes in form and details may be made therein without departing from the spirit and scope of the present invention.

The invention claimed is:

1. An electrochemical cell comprising:
   an electrode comprising a current collector, and positive and negative active material layers disposed at both sides of the current collector and spaced apart from each other with a current collector extension part being located therebetween, wherein a polarity of the electrode is used as an opposite polarity in a neighboring cell;
   an electrode assembly formed by stacking a plurality of electrodes, the plurality of electrodes comprising the electrode; and
   an electric connection part connecting some of the electrodes of the electrode assembly which are included in the same series, the electric connection part connecting the some electrodes in parallel.

2. The electrochemical cell of claim 1, wherein the electric connection part is connected to the current collector extension part of the electrode.

3. The electrochemical cell of claim 1, wherein a conductor is disposed at the current collector extension part of the electrode as the electric connection part so as to electrically connect current collector extension parts of neighboring electrodes.

4. The electrochemical cell of claim 3, wherein the conductor comprises a conductive adhesive material.

5. The electrochemical cell of claim 3, wherein the conductor comprises a conductive strip.

6. The electrochemical cell of claim 5, wherein the conductive strip is formed of a metal.

7. The electrochemical cell of claim 6, wherein the conductive strip is connected to the current collector of the electrode by welding.

8. The electrochemical cell of claim 5, wherein the conductive strip is formed of the same kind of material as that used for forming the current collector of the electrode.

9. The electrochemical cell of claim 1, wherein the current collector extension part of the electrode or a portion of the current collector extension part of the electrode is thicker than portions of the current collector at which the active material layers are disposed.

10. The electrochemical cell of claim 9, wherein the thicker current collector extension part or the thicker portion of the current collector extension part comprises concave-convex top and bottom sides so that thicker current collector extension parts or thicker portions of current collector extension parts of neighboring electrodes are engaged with each other.

11. The electrochemical cell of claim 9, wherein the thicker current collector extension part or the thicker portion of the current collector extension part of the electrode is connected to a thicker current collector extension part or a thicker portion of a current collector extension part of a neighboring electrode by using at least one of welding, a conductive adhesive, and soldering.

12. The electrochemical cell of claim 1, wherein the electric connection part is disposed at the current collector extension part of the electrode to be used as an electrolyte isolation part between neighboring unit cells.

13. The electrochemical cell of claim 1, further comprising a connection part through which the electrode of the electrode assembly is connected to an external part.

14. The electrochemical cell of claim 13, further comprising a case accommodating the electrode assembly, wherein the case comprises:
- at least one hole formed at a position corresponding to the current collector extension part of the electrode of the electrode assembly; and
- a conductive strip attached to an inner surface of the case at the hole, wherein the conductive strip is electrically connected to the current collector extension part of the electrode of the electrode assembly.

15. The electrochemical cell of claim 13, further comprising:
- a core installed at a side of the electrode assembly, wherein the core comprises:
- at least one conductive wire hole; and
- a connection hole formed at a position corresponding to the current collector extension part of the electrode of the electrode assembly and connected to the conductive wire hole,
- wherein a conductive wire inserted in the conductive wire hole and protruding outward from the core through the connection hole is connected to the current collector extension part of the electrode of the electrode assembly by using at least one of welding, a conductive adhesive, and soldering.

16. The electrochemical cell of claim 15, wherein a portion of the conductive wire protruding outward from the core has a strip shape.

17. The electrochemical cell of claim 15, wherein a conductor is connected to a portion of the conductive wire protruding outward from the core, and the conductor is connected to the current collector extension part of the electrode of the electrode assembly by using at least one of welding, a conductive adhesive, and soldering.

18. The electrochemical cell of claim 1, further comprising:
- an electrolyte isolation part disposed at the current collector extension part of the electrode of the electrode assembly;
- a core installed at a side of the electrode assembly and comprising at least one electrolyte injection hole;
- at least one connection hole formed in the core at a position corresponding to the current collector extension part of the electrode assembly and connected to the electrolyte injection hole; and
- an electrolyte injection port formed at a side of a case accommodating the electrode assembly, the electrolyte injection port being connected to the electrolyte injection hole of the core.

19. The electrochemical cell of claim 18, wherein a safety vent is disposed at the electrolyte injection port.

20. The electrochemical cell of claim 18, wherein a gas-permeable membrane is disposed at the electrolyte injection port.

* * * * *